(12) United States Patent
Li

(10) Patent No.: US 8,870,215 B2
(45) Date of Patent: Oct. 28, 2014

(54) LOCKING MECHANISM AND STROLLER THEREWITH

(71) Applicant: Jian-Qun Li, Guangdong (CN)

(72) Inventor: Jian-Qun Li, Guangdong (CN)

(73) Assignee: Wonderland Nurserygoods Company Limited, Kwai Chung, N.T. (HK)

( * ) Notice: Subject to any disclaimer, the term of this patent is extended or adjusted under 35 U.S.C. 154(b) by 0 days.

(21) Appl. No.: 13/936,218

(22) Filed: Jul. 8, 2013

(65) Prior Publication Data

US 2014/0028002 A1 Jan. 30, 2014

(30) Foreign Application Priority Data

Jul. 24, 2012 (CN) .......................... 2012 1 0258122

(51) Int. Cl.
*B62B 1/00* (2006.01)
*B62B 9/00* (2006.01)
*B62B 7/06* (2006.01)

(52) U.S. Cl.
CPC .... *B62B 9/00* (2013.01); *B62B 7/06* (2013.01)
USPC ....................................................... 280/647

(58) Field of Classification Search
CPC ........ B62B 7/044; B62B 7/04; B60N 2/2806; B60N 2/2854; A61G 5/08; A61G 5/1059
USPC ......... 280/33.993, 47.38, 639, 642, 643–644, 280/647–648, 649–650, 658
See application file for complete search history.

(56) References Cited

U.S. PATENT DOCUMENTS

| | | | |
|---|---|---|---|
| 6,581,957 B1 * | 6/2003 | Lan ................................ | 280/642 |
| 6,695,400 B2 * | 2/2004 | Washizuka et al. ........... | 297/130 |
| 8,424,900 B2 * | 4/2013 | Ryan et al. .................... | 280/647 |
| 8,534,698 B2 * | 9/2013 | Dotsey .......................... | 280/642 |
| 2008/0315562 A1 | 12/2008 | Song et al. | |
| 2013/0291388 A1 * | 11/2013 | Crorey ............................ | 30/124 |

FOREIGN PATENT DOCUMENTS

| | | |
|---|---|---|
| CN | 201745620 U | 2/2011 |
| CN | 202686430 U | 1/2013 |
| WO | 2013092600 A1 | 6/2013 |

* cited by examiner

*Primary Examiner* — John Walters
*Assistant Examiner* — James Triggs
(74) *Attorney, Agent, or Firm* — Winston Hsu; Scott Margo

(57) ABSTRACT

The present invention provides a locking mechanism installed on a seat plate of a stroller and for locking or unlocking a frame of the stroller and the stroller therewith. The locking mechanism includes a cross pipe connected to the frame, and an engaging component pivoted to the seat plate. The engaging component includes an engaging slot, and the engaging component rotates to engage the cross pipe in the engaging slot or to separate the engaging slot from the cross pipe, so as to lock or unlock the frame of the stroller. The frame of the stroller can be unlocked and folded by rotating the engaging component, so that it has an advantage of easy and convenient operation.

10 Claims, 6 Drawing Sheets

LOCKING MECHANISM AND STROLLER THEREWITH

BACKGROUND OF THE INVENTION

1. Field of the Invention

The present invention relates to a locking mechanism and a stroller therewith, and more specifically, to a locking mechanism capable of locking and folding a frame of a stroller conveniently and the stroller therewith.

2. Description of the Prior Art

For parents, a stroller is a convenient and common tool for taking care of a baby. Thus, government agencies have established many related laws and safety regulations for design of the stroller so as to ensure the safety of the baby while it is in the stroller. It is an important issue to design a safe folding mechanism for preventing failure of operation, resulting in hurt to the baby. An auxiliary safety lock is used in the stroller for locking the folding mechanism to prevent an accidental fold as the folding mechanism of the stroller fails. Currently, there are two typical kinds of the folding mechanisms in the market. One is to fold a front part and a rear part to stand the stroller in a compact shape, such as for the stroller with seating and lying functions. The other is to fold a left part and a right part and then to fold an upper part and a lower part to make the folded stroller slender, such as for an umbrella stroller. As a frame of the stroller is to be folded, the auxiliary safety lock has to be unlocked and then a main lock mechanism can be unlocked to release the constraint on the frame. It can prevent the accidental fold due to inadvertent actuation of the main lock mechanism. However, the conventional auxiliary safety lock is often disposed on the rear of the frame or on a handle. A user needs to actuate the conventional auxiliary safety lock hardly to unlock and fold the frame, and it renders difficult and inconvenient operation.

SUMMARY OF THE INVENTION

A purpose of the present invention is to provide a locking mechanism and a stroller therewith capable of unlocking a frame of the stroller easily and conveniently, to solve the problems mentioned above.

In order to achieve above purposes, the present invention is to provide a locking mechanism installed on a seat plate of a stroller and for locking or unlocking a frame of the stroller. The locking mechanism includes a cross pipe connected to the frame, and an engaging component pivoted to the seat plate. The engaging component includes an engaging slot, and the engaging component rotates to engage the cross pipe in the engaging slot or to separate the engaging slot from the cross pipe, so as to lock or unlock the frame of the stroller.

Preferably, an opening is formed on the seat plate, the locking mechanism further includes a release button pivoted to the seat plate, an end of the release button is inserted into the opening, and the other end of the release button contacts against the engaging component.

Preferably, the engaging component further includes an arc sliding flange facing to the release button, and the release button includes a contacting portion for contacting against the arc sliding flange.

Preferably, the locking mechanism further includes a resilient component, an end of the resilient component is connected to a front end of the engaging component, and the other end of the resilient component is connected to a bottom of the seat plate.

Preferably, the resilient component is a spring.

Preferably, the engaging component includes a slot structure for containing the resilient component.

Preferably, the end of the release button inserting into the opening is a pressing portion and does not protrude out of the opening.

Preferably, the pressing portion is disposed on a side of the release button.

Preferably, two slotted holes are formed on the seat plate, the engaging component includes two rings at two lateral sides, the locking mechanism further includes a webbing, and two ends of the webbing pass through the two slotted holes on the seat plate and are fixed on the two rings respectively.

In order to achieve above purposes, the present invention is further to provide a stroller including a frame, a seat plate installed on the frame, and a locking mechanism installed on the seat plate and for locking or unlocking the frame. The locking mechanism includes a cross pipe connected to the frame, and an engaging component pivoted to the seat plate. The engaging component includes an engaging slot, and the engaging component rotates to engage the cross pipe in the engaging slot or to separate the engaging slot from the cross pipe, so as to lock or unlock the frame.

Preferably, the frame further includes a basket pipe, and the cross pipe is fixed on the basket pipe.

Preferably, the frame further includes a handle, a front leg, a rear leg, a supporting pipe and a seat pipe, a lower end of the handle is pivoted to an upper end of the front leg, an upper end and a lower end of the supporting pipe are respectively pivoted to the handle and the rear leg, and a front portion and a rear portion of the basket pipe are respectively pivoted to the front leg and the rear leg.

Preferably, the seat plate is pivoted to the frame, and the seat pipe is for supporting the seat plate In the present invention, the locking mechanism of the present invention includes the cross pipe connected to the frame, and the engaging component pivoted to the seat plate. The engaging component includes the engaging slot, and the engaging component rotates to engage the cross pipe in the engaging slot or to separate the engaging slot from the cross pipe, so as to lock or unlock the frame of the stroller. Thus, the frame of the stroller can be unlocked and folded by rotating the engaging component slightly, so that it has an advantage of easy and convenient operation. Besides, the release button can prevent the webbing from being pulled accidentally or for preventing the cross pipe from separating from the engaging slot accidentally, so as to avoid danger of unlocking the frame inadvertently.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
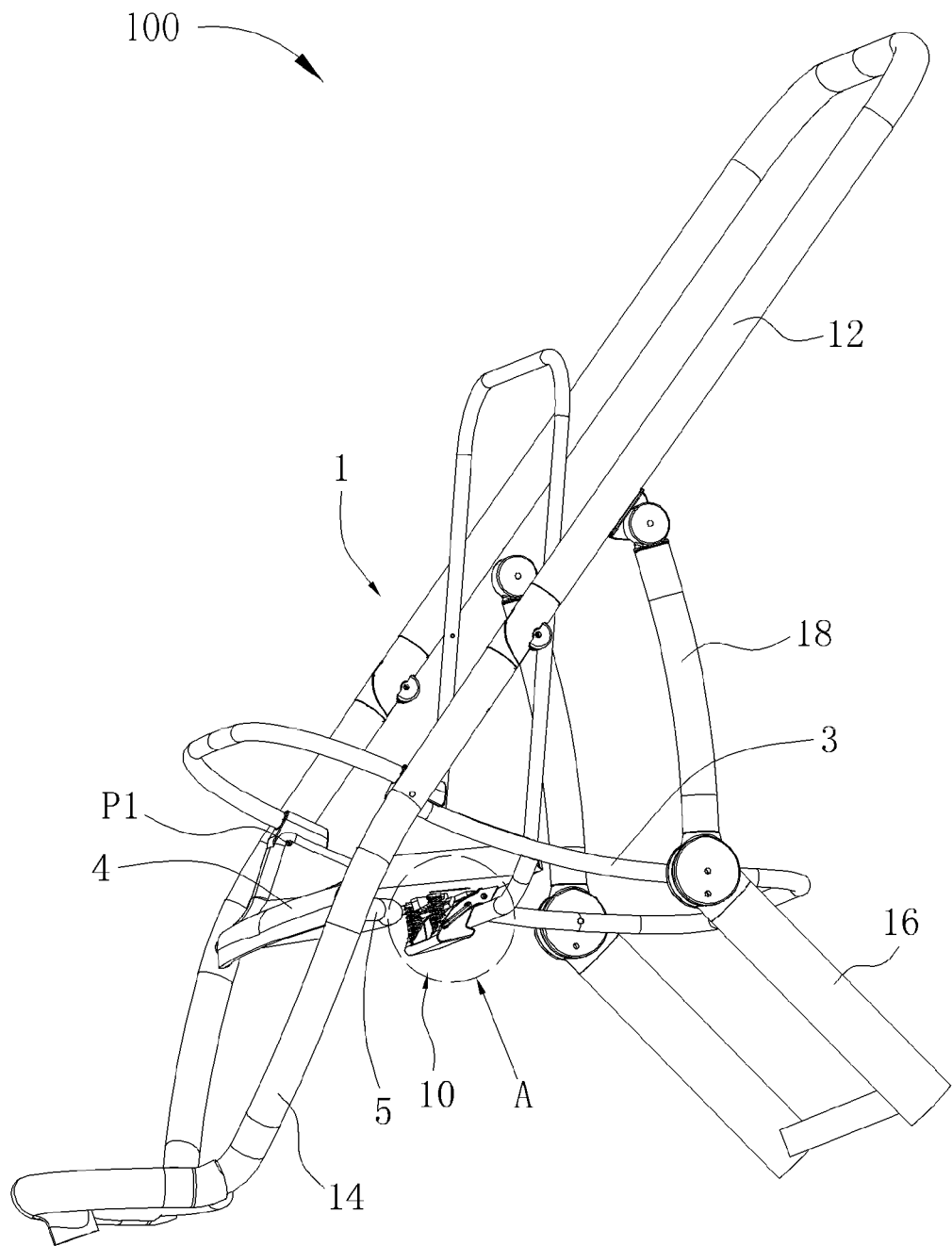
FIG. 1 is a schematic drawing of a stroller according to an embodiment of the present invention.

Please refer to FIG. 1. FIG. 1 is a schematic drawing of a stroller 100 according to an embodiment of the present invention. The stroller 100 includes a frame 1. The frame 1 includes comprises a handle 12, a front leg 14, a rear leg 16, a supporting pipe 18, a basket pipe 3 and a seat pipe 5. A lower end of the handle 12 is pivoted to an upper end of the front leg 14. An upper end and a lower end of the supporting pipe 18 are respectively pivoted to the handle 12 and the rear leg 16. A front portion and a rear portion of the basket pipe 3 are respectively pivoted to the front leg 14 and the rear leg 16.

Figure 2:
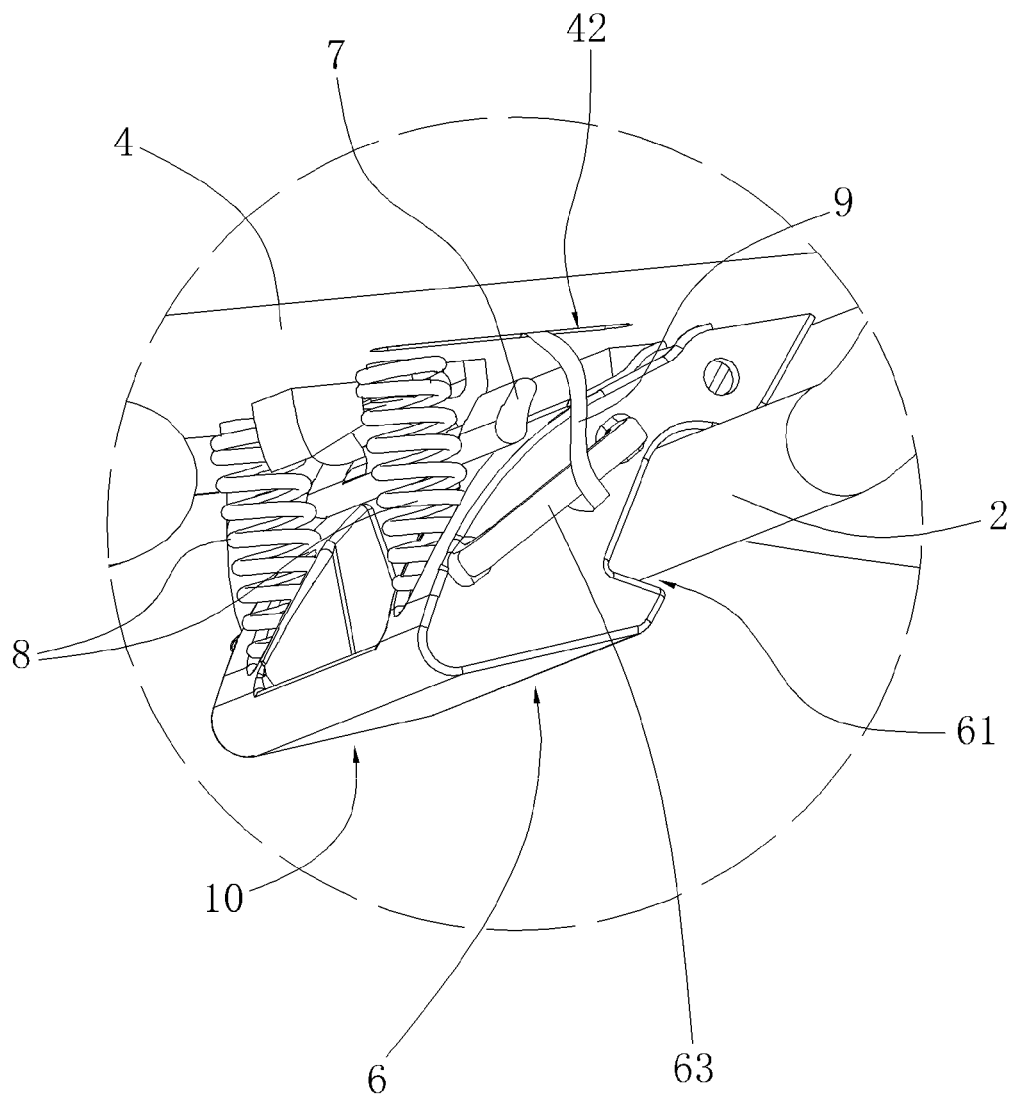
FIG. 2 is an enlarged diagram of Part A of FIG. 1 according to the embodiment of the present invention.
Figure 3:
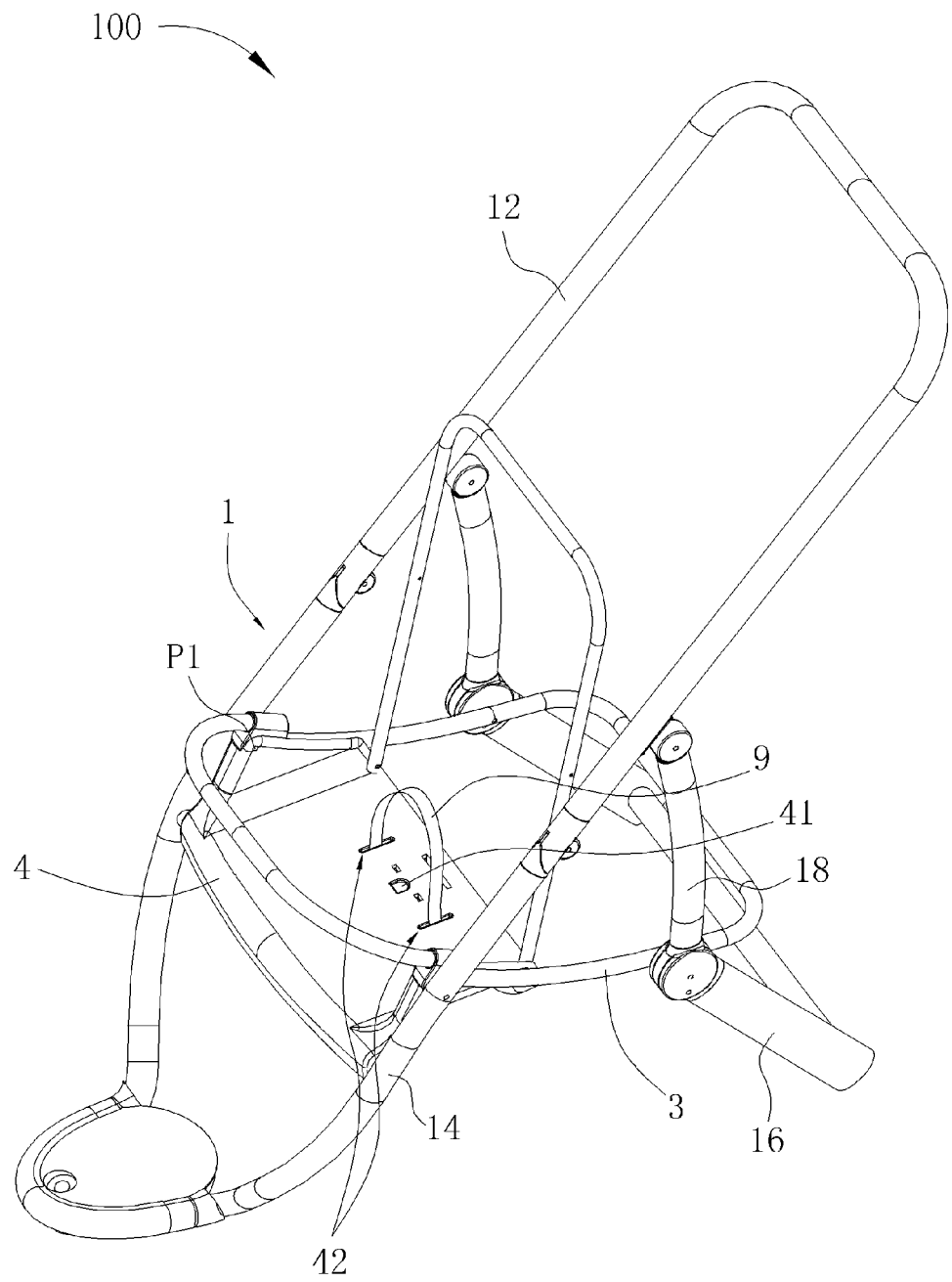
FIG. 3 is another view of the stroller according to the embodiment of the present invention.

Please refer to FIG. 1 to FIG. 3. FIG. 2 is an enlarged diagram of Part A of FIG. 1 according to the embodiment of the present invention. FIG. 3 is another view of the stroller 100 according to the embodiment of the present invention. The stroller 100 further includes a seat plate 4 installed on the frame 1. For example, the seat plate 4 can be pivoted to the frame 1 via a pivotal shaft P1. The seat pipe 5 is for supporting and fixing the seat plate 4. The stroller 100 further includes a locking mechanism 10 installed on the seat plate 4 and for locking or unlocking the frame 1. The locking mechanism 10 includes a cross pipe 2 connected to the frame 1, and an engaging component 6 pivoted to the seat plate 4. The cross pipe 2 can be fixed on the basket pipe 3, such as in a welding manner. The engaging component 6 includes an engaging slot 61, and the cross pipe 2 can be engaged in the engaging slot 61. As the engaging component 6 rotates to engage the cross pipe 2 in the engaging slot 61 to lock the cross pipe 2, the frame 1 of the stroller 100 can be locked. As the engaging component 6 rotates to separate the engaging slot 61 from the cross pipe 2 to unlock the cross pipe 2, the frame 1 of the stroller 100 can be unlocked and then be folded freely.

Figure 4:
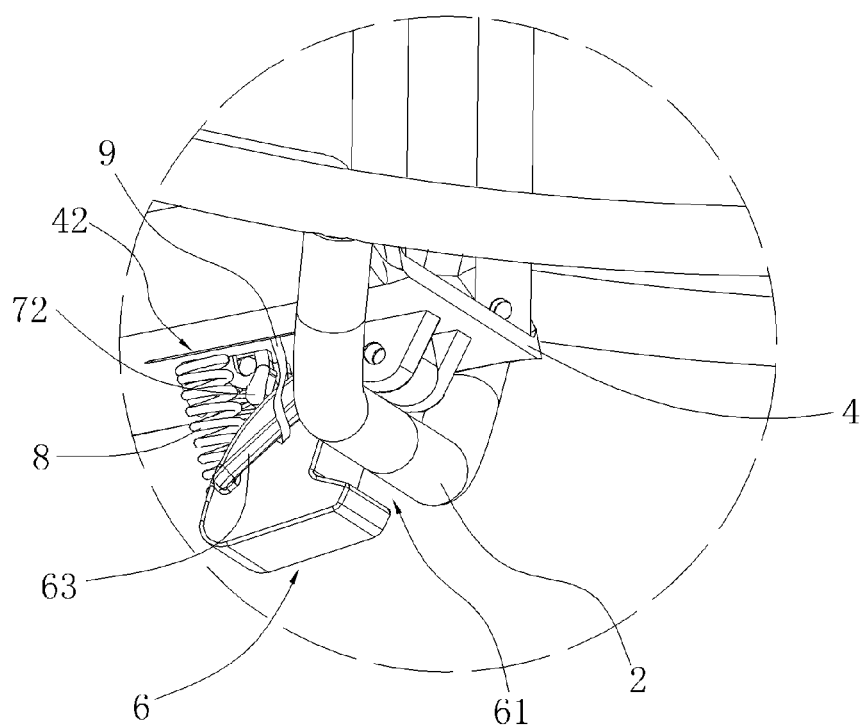
FIG. 4 is a structural diagram of a cross pipe engaging in an engaging slot according to the embodiment of the present invention.
Figure 5:
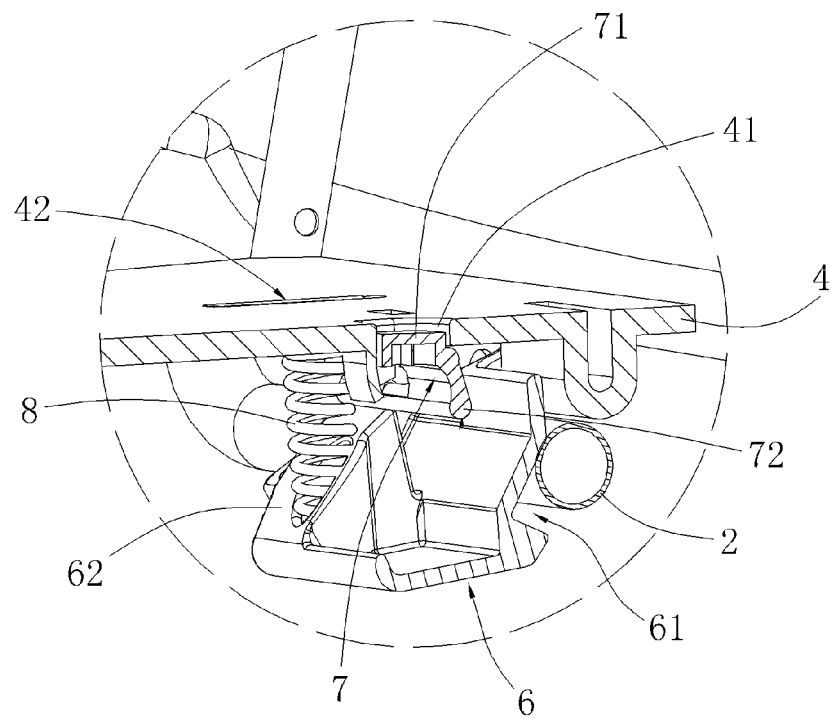
FIG. 5 is a sectional diagram illustrating the cross pipe engaging in the engaging slot according to the embodiment of the present invention.
Figure 6:
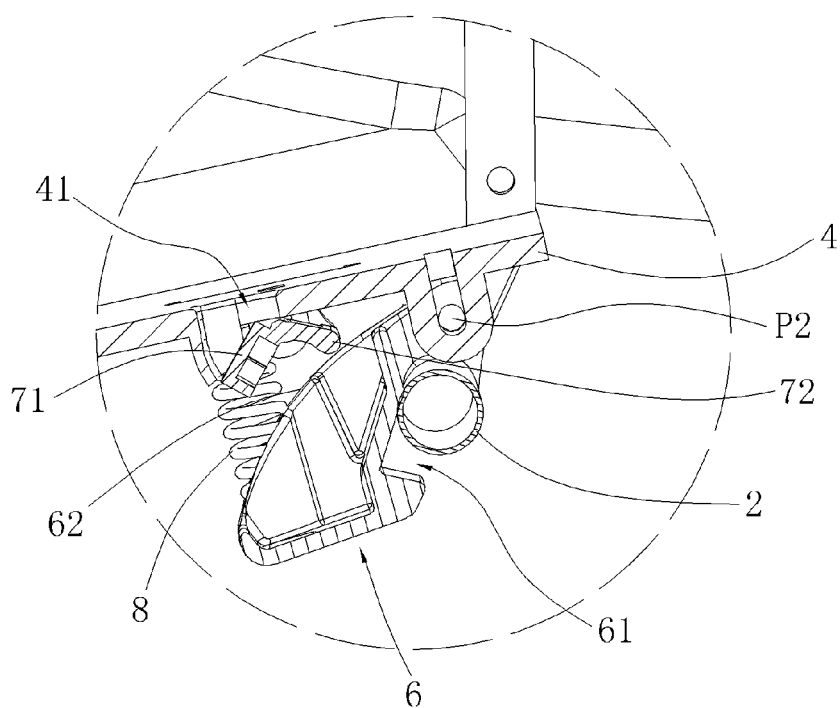
FIG. 6 is a sectional diagram illustrating the cross pipe being separated from the engaging slot according to the embodiment of the present invention.

Please refer to FIG. 4 to FIG. 6. FIG. 4 is a structural diagram of the cross pipe 2 engaging in the engaging slot 61 according to the embodiment of the present invention. FIG. 5 is a sectional diagram illustrating the cross pipe 2 engaging in the engaging slot 61 according to the embodiment of the present invention. FIG. 6 is a sectional diagram illustrating the cross pipe 2 being separated from the engaging slot 61 according to the embodiment of the present invention. The engaging component 6 can be pivoted to the seat plate 4 via a pivotal shaft P2. Preferably, two slotted holes 42 are formed on the seat plate 4. The engaging component 6 includes two rings 63 at two lateral sides. The locking mechanism 10 further includes a webbing 9, and two ends of the webbing 9 pass through the two slotted holes 42 on the seat plate 4 and are fixed on the two rings 63 of the engaging component 6 respectively. A user can pull the webbing 9 to separate the engaging component 6 from the cross pipe 2 for folding the frame 1.

Preferably, an opening 41 is formed on the seat plate 4. The locking mechanism 10 further includes a release button 7, as an auxiliary safety lock, which is pivoted to the seat plate 4. An end of the release button 7 is inserted into the opening 41, and the other end of the release button 7 contacts against the engaging component 6. As the end of the release button 7, which is inserted into the opening 41, is pressed down, the other end of the release button 7, which is for contacting against the engaging component 6, can separate from the engaging component 6, so that the engaging component 6 can rotate freely. Then, the user can pull the webbing 9 to drive the engaging component 6, so as to separate the engaging component 6 from the cross pipe 2 for folding the frame 1. The release button 7 is designed for preventing the webbing 9 from being pulled accidentally or for preventing the cross pipe 2 from separating from the engaging slot 61 accidentally, so as to avoid danger of unlocking the frame 1 inadvertently.

Figure 7:
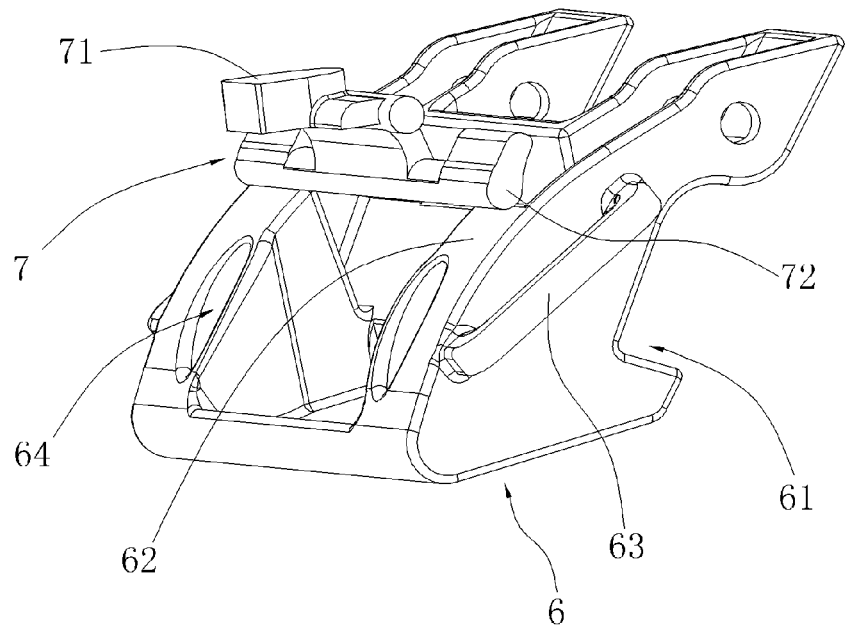
FIG. 7 is a diagram of an engaging component and a release button according to the embodiment of the present invention.

Please refer to FIG. 7. FIG. 7 is a diagram of the engaging component 6 and the release button 7 according to the embodiment of the present invention. Preferably, the engaging component 6 further includes an arc sliding flange 62 facing to the release button 7, and the release button 7 includes a contacting portion 72 for contacting against the arc sliding flange 62. The contacting portion 72 of the release button 7 can slide along the arc sliding flange 62 of the engaging component 6. The end of the release button 7 inserting into the opening 41 is a pressing portion 71, and the pressing portion 71 does not protrude out of the opening 41, so as to prevent accidental actuation of the pressing portion 71. The pressing portion 71 is disposed on a side of the release button 7, and the contacting portion 72 of the release button 7 can slide along the arc sliding flange 62 of the engaging component 6 easily as the pressing portion 71 is pressed. A resilient component, such as a spring or a torsional spring, can be disposed between the seat plate 4 and the release button 7 for recovering the release button 7 after the pressing portion 71 is released.

Preferably, the locking mechanism 10 further includes at least one resilient component 8 for abutting the engaging component 6. An end of the resilient component 8 is connected to a front end of the engaging component 6, and the other end of the resilient component 8 is connected to a bottom of the seat plate 4. The resilient component 8 abuts against the engaging component 6 so that the engaging component 6 contacts against the cross pipe 2 for engaging with the cross pipe 2, so as to lock the frame 1 stably. In this embodiment, the resilient component 8 is a spring, and there are two resilient components 8, but are not limited to the above. As shown in FIG. 7, the engaging component 6 further includes a slot structure 64 for containing the resilient component 8, for enhancing connection of the engaging component 6 and the resilient component 8.

Figure 8:
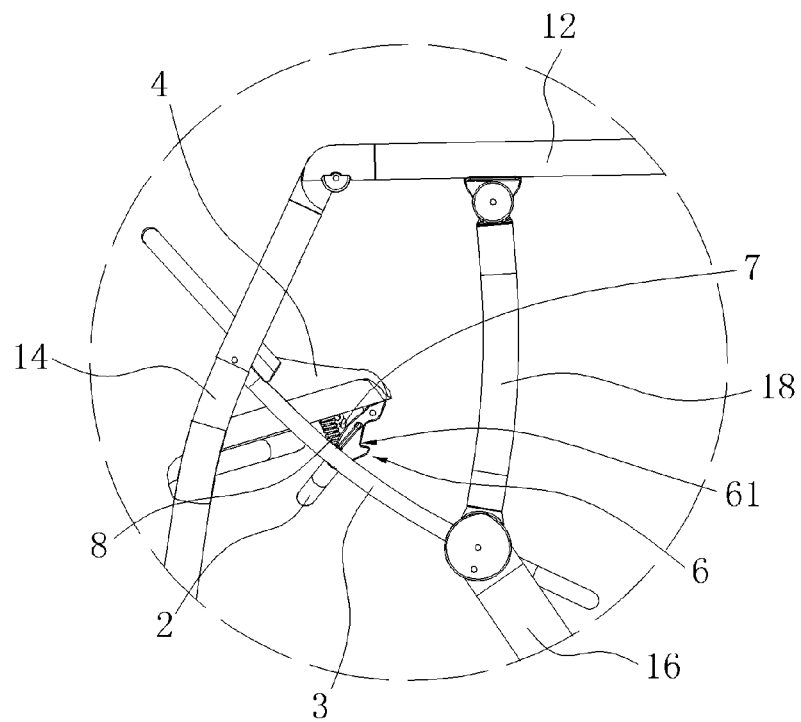
FIG. 8 is a structural diagram of a frame being folded according to the embodiment of the present invention.
Figure 9:
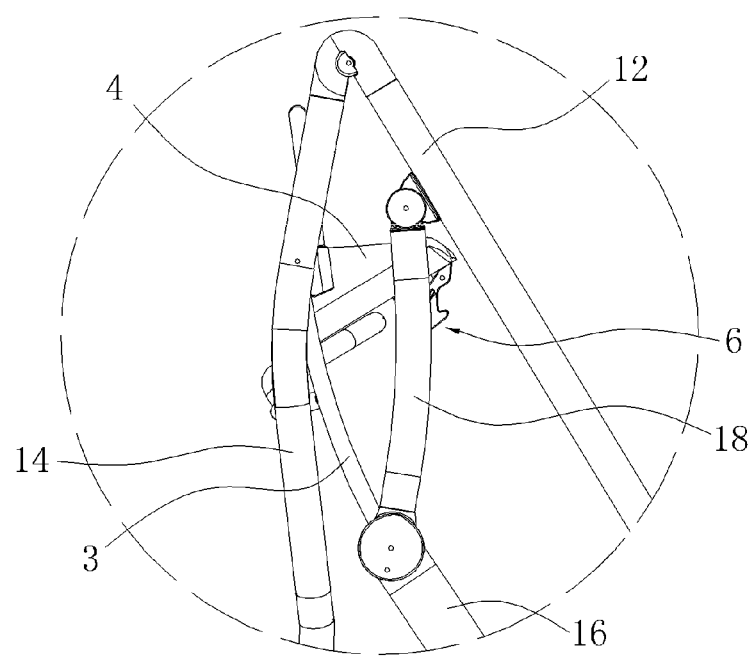
FIG. 9 is a structural diagram of the frame having been folded according to the embodiment of the present invention.

Please refer to FIG. 1 to FIG. 9. FIG. 8 is a structural diagram of the frame 1 being folded according to the embodiment of the present invention. FIG. 9 is a structural diagram of the frame 1 having been folded according to the embodiment of the present invention. As it is desired to fold the unfolded and locked stroller 100, the user can press the pressing portion 71 of the release button 7 disposed in the opening 41 on the seat plate 4 for sliding the contacting portion 72 of the release button 7 to separate from the arc sliding flange 62 of the engaging component 6, that is, to release constraint of the engaging component 6 by the contacting portion 72 of the release button 7. Then, the user can pull the webbing 9 to drive the engaging component 6, so as to separate the engaging component 6 from the cross pipe 2 for folding the frame 1. On the other hand, as opening the stroller 100, it only needs to insert the cross pipe 2 in the engaging slot 61 and make the contacting portion 72 of the release button 7 contact against the arc sliding flange 62 of the engaging component 6, for locking the cross pipe 2, so as to lock the frame 1 of the stroller 100.

In contrast with the prior art, the locking mechanism of the present invention includes the cross pipe connected to the frame, and the engaging component pivoted to the seat plate. The engaging component includes the engaging slot, and the engaging component rotates to engage the cross pipe in the engaging slot or to separate the engaging slot from the cross pipe, so as to lock or unlock the frame of the stroller. Thus, the frame of the stroller can be unlocked and folded by rotating the engaging component slightly, so that it has an advantage of easy and convenient operation. Besides, the release button can prevent the webbing from being pulled accidentally or for preventing the cross pipe from separating from the engaging slot accidentally, so as to avoid danger of unlocking the frame inadvertently.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A locking mechanism installed on a seat plate of a stroller and for locking or unlocking a frame of the stroller, an opening is formed on the seat plate, the locking mechanism comprising:
   a cross pipe connected to the frame;
   an engaging component pivoted to the seat plate, the engaging component comprising an engaging slot, and the engaging component rotating to engage the cross pipe in the engaging slot or to separate the engaging slot from the cross pipe, so as to lock or unlock the frame of the stroller;
   a release button pivoted to the seat plate, an end of the release button being inserted into the opening, the other end of the release button contacting against the engaging component, the release button comprising a contacting portion; and
   an arc sliding flange facing to the release button, the contacting portion of the release button contacting against the arc sliding flange.

2. The locking mechanism of claim 1, further comprising a resilient component, an end of the resilient component being connected to a front end of the engaging component, and the other end of the resilient component being connected to a bottom of the seat plate.

3. The locking mechanism of claim 2, wherein the resilient component is a spring.

4. The locking mechanism of claim 2, wherein the engaging component comprises a slot structure for containing the resilient component.

5. The locking mechanism of claim 1, wherein the end of the release button inserting into the opening is a pressing portion and does not protrude out of the opening.

6. The locking mechanism of claim 5, wherein the pressing portion is disposed on a side of the release button.

7. The locking mechanism of claim 1, wherein two slotted holes are formed on the seat plate, the engaging component comprises two rings at two lateral sides, the locking mechanism further comprises a webbing, and two ends of the webbing pass through the two slotted holes on the seat plate and are fixed on the two rings respectively.

8. A stroller comprising:
   a frame comprising a basket pipe;
   a seat plate installed on the frame; and
      a locking mechanism installed on the seat plate and for locking or unlocking the frame, the locking mechanism comprising:
      a cross pipe connected to the frame and fixed on the basket pipe; and
      an engaging component pivoted to the seat plate, the engaging component comprising an engaging slot, and the engaging component rotating to engage the cross pipe in the engaging slot or to separate the engaging slot from the cross pipe, so as to lock or unlock the frame.

9. The stroller of claim 8, wherein the frame further comprises a handle, a front leg, a rear leg, a supporting pipe and a seat pipe, a lower end of the handle is pivoted to an upper end of the front leg, an upper end and a lower end of the supporting pipe are respectively pivoted to the handle and the rear leg, and a front portion and a rear portion of the basket pipe are respectively pivoted to the front leg and the rear leg.

10. The stroller of claim 9, wherein the seat plate is pivoted to the frame, and the seat pipe is for supporting the seat plate.

* * * * *